(12) United States Patent
Kolbe et al.

(10) Patent No.: US 6,739,248 B2
(45) Date of Patent: May 25, 2004

(54) SEAL FOR CHAMBERED DOCTOR BLADE

(75) Inventors: Wilfried Kolbe, Gülzow (DE); Klaus Schirrich, Bielefeld (DE); Lars Grüter, Gütersloh (DE)

(73) Assignee: Fischer & Krecke GmbH & Co., Bielefeld (DE)

( * ) Notice: Subject to any disclaimer, the term of this patent is extended or adjusted under 35 U.S.C. 154(b) by 0 days.

(21) Appl. No.: 10/359,367

(22) Filed: Feb. 6, 2003

(65) Prior Publication Data

US 2003/0150345 A1 Aug. 14, 2003

(30) Foreign Application Priority Data

Feb. 8, 2002 (EP) ............................... 02002829

(51) Int. Cl.⁷ ................................. B41F 31/00
(52) U.S. Cl. .................... 101/169; 101/350.6; 101/367
(58) Field of Search ................. 101/363, 364, 101/365, 366, 367, 350.1, 350.6, 157, 159, 169

(56) References Cited

U.S. PATENT DOCUMENTS

| | | |
|---|---|---|
| 4,392,427 A | 7/1983 | Wieland ..................... 101/365 |
| 4,581,995 A | 4/1986 | Stone |
| 5,027,513 A | 7/1991 | Allison, Jr. ................. 101/169 |
| 5,117,752 A | 6/1992 | Micheli ..................... 101/207 |
| 5,125,341 A | 6/1992 | Yaeso ........................ 101/367 |
| 5,150,651 A | 9/1992 | Flores ........................ 101/366 |
| 5,182,992 A | 2/1993 | Rogge ........................ 101/363 |
| 5,662,042 A | 9/1997 | Compton et al. ........ 101/350.6 |
| 5,746,125 A | 5/1998 | Tani ........................... 101/123 |
| 6,293,195 B1 | 9/2001 | Allison, Jr. .............. 101/350.6 |
| 6,471,773 B1 | 10/2002 | Atkins ..................... 101/350.6 |
| 6,571,703 B1 | 6/2003 | Metrope .................. 101/350.1 |
| 6,598,525 B2 | 7/2003 | Metrope .................... 101/363 |
| 2002/0152904 A1 | 10/2002 | Russ et al. ................... 101/169 |

FOREIGN PATENT DOCUMENTS

| | | |
|---|---|---|
| DE | 1224327 | 9/1966 |
| DE | 4241792 | 6/1994 |
| DE | 4302671 | 8/1994 |

*Primary Examiner*—Eugene H. Eickholt
(74) *Attorney, Agent, or Firm*—Richard M. Goldberg

(57) ABSTRACT

A seal for a chambered doctor blade (10) of a printing machine, in the form of a rubber-elastic body, which is inserted at the end of the chambered doctor blade in a seal holder (18) and, with an obliquely applied lip (24), lies against the periphery of a roller (12), against which the chambered doctor blade is placed, wherein the seal (20) has a second lip (24), which forms a V-shaped cross section with the first.

21 Claims, 2 Drawing Sheets

SEAL FOR CHAMBERED DOCTOR BLADE

BACKGROUND OF THE INVENTION

The invention relates to a seal for a chambered doctor blade of a printing machine, in the form of a rubber-elastic body, which is inserted at the end of the chambered doctor blade in a seal holder and, with an obliquely applied lip, lies against the periphery of a roller, in contact with which the chambered doctor blade is placed.

A chambered doctor blade is used, for example, in a flexographic printing machine, for inking an anilox roller, which then, in turn, transfers the printing ink to the block of the printing cylinder. The chambered doctor blade forms a chamber, which extends in the longitudinal direction of the anilox roller, is filled with printing ink during the printing operation and is bounded on the side, facing the anilox roller, by two doctor blades, which are placed at an angle against the periphery of the anilox roller. The seals, which form the object of the invention, are intended to close off the chamber tightly at both ends. Consequently, the seal must lie against the peripheral surface of the rotating anilox roller and is consequently exposed to appreciable mechanical stresses as well as to much wear. The stiffer the seal and the greater the force, with which it is pressed against the anilox roller, the higher is the sealing action and the greater is also the wear resulting from the friction of the anilox roller. Conversely, if the seal is relatively soft, leaks can occur not only at the contact line between the anilox roller and the seal, but also between the seal and the seal holder. Furthermore, the sealing problem is made more difficult owing to the fact that, during the operation of the printing machine, there is wear of the doctor blades, so that the geometry of the cross section, which is to be sealed, is changed. The places, at which the seal, the anilox roller and the doctor blade adjoin one another, are particularly susceptible to leakage.

From the art, a seal of the type mentioned above is known, which has a continuous lip, set at an angle, on the side, facing the anilox roller, as well as on the side, facing the seal holder. The compliance of the lip can be adjusted by the inclination and profile of the lip, so that a suitable compromise is achieved between sealing properties, wear susceptibility and tolerance equalization.

SUMMARY OF THE INVENTION

It is an object of the invention, to improve the sealing properties of such a seal.

Pursuant to the invention, this objective is accomplished owing to the fact that the seal has a second lip, which forms a V-shaped cross section with the first.

Due to the second lip, a redundancy and, with that, an improvement in the sealing properties is achieved. In addition, the V-shaped configuration causes the two lips to contact the roller at an angle in opposite directions, so that the sensitivity with respect to changing mechanical stresses is reduced appreciably.

In practice, the seal frequently is exposed to a changing pressure gradient between the interior of the chambered doctor blade and the surroundings. During the printing operation, there is generally an overpressure in the chambered doctor blade. On the other hand, while the inking system is being cleaned and the chambered doctor blade is being flushed with a cleaning fluid, there is frequently a reduced pressure in the chamber. In the case of the inventive seal, these changing pressure stresses always have the effect that one of the lips is swiveled away from the anilox roller, so that its sealing action is reduced. However, to compensate for this, the other lip is pressed all the more tightly against the anilox roller. In this way, a high sealing effect is achieved, independently of the direction of the pressure gradient. Because of this effect, the seal is also less sensitive to changing stresses, which can come about, for example, due to an axial clearance of the anilox roller and/or the thermal expansion of the anilox roller.

Advantageous developments of the invention arise out of the dependent claims.

Preferably, the lips are formed not only in the part of the seal, which is in contact with the anilox roller, but also in the parts, which are in contact with the doctor blade. A high compliance of the seal is achieved in this way, particularly at the points, at which the peripheral surface of the anilox roller, the sealing lip and one of the doctor blades coincide, so that the sealing lip can also adapt itself well to any wear at the doctor blade.

In a particularly preferred embodiment, the contact lines, made by the two sealing lips with the peripheral surface of the anilox roller, run parallel to one another, whereas the contact lines in the region of the doctor blade diverge obliquely to the outside. The sealing lips are under a slight pressure at the periphery of the anilox roller and at the doctor blades and, as a result, are bent apart slightly. If there is wear at the edge of the doctor blade, the obliquely diverging parts of the contact lines of the sealing lips with the anilox roller come into frictional contact and the frictional forces ensure that the sealing lips in this region are restored somewhat to the upright position once again in this region. In this way, good contact of the sealing lip with the anilox roller and with the doctor blade is achieved especially at the point, at which the peripheral surface of the rotating anilox roller runs out at an acute angle onto the doctor blade. Good contact of the sealing lip is particularly important especially at this point, because the printing ink is carried along by the rotating anilox roller and pushes against the edge of the doctor blade, so that good sealing against the dynamic pressure of the printing ink is required at this point.

The above-described course of the contact lines of the sealing lips at the anilox roller and at the doctor blades is achieved preferably owing to the fact that the seal, in its part facing the anilox roller, tapers in pyramid fashion towards the anilox roller. At the same time, this has the advantage that the parts of the sealing lips lying in contact with the anilox roller can be bent apart more or less, depending on the contacting force, without coming up against the walls of the seal holder.

At the inner sides, the two sealing lips preferably are bounded by a V-shaped notch, which passes in the peripheral direction of the anilox roller through the seal. Since the surface regions of the seal, on which the two doctor blades rest, brace obliquely from the periphery of the anilox roller, the notch in these regions runs out into an acute angle, so that the cross section of the sealing lips increases progressively from here to the ends of the seal. In this way, the stiffness of the sealing lips is controlled so that the latter, are relatively compliant in the region of the anilox roller and at the transitions between the anilox roller and the doctor blades and become stiffer in the regions, which support the doctor blades, so that a firm contact with the stationery doctor blades is achieved.

At the outside of the seal, the sealing lips are bounded preferably by pockets, which are constructed in the flanks of the tapering part of the seal and also extend into the regions, in which the seal is in contact with the doctor blades. The stiffness of the sealing lips can be adjusted, as required, by means of the geometry of these pockets.

Preferably, each of the two sealing lips has, on the inside, an auxiliary sealing lip, which extends at a small distance from and parallel to the main ridge and ensures additional sealing in the region of the peripheral surface of the anilox roller.

The part of the seal, taken up in the seal holder, preferably is constructed as a solid, rectangular block, which is surrounded at the two longitudinal sides and at one end face by an assemblage of continuous tolerance equalization lips, which compensate for the clearance between the sealing body and the seal holder. On the other end face and, moreover, on the side, which is located in the direction of rotation of the anilox roller, the seal is supported, on the other hand, over the whole of its surface at the wall of the chambered doctor blade. Due to frictional forces, the rotating anilox roller has the tendency to carry along the seal in the direction of rotation, so that the seal is pressed firmly against the wall in question of the chambered doctor blade. At this place, the contact of the seal over its whole surface has the advantage that the supporting forces can be absorbed stably. On the other hand, at the three remaining sides, at which the tolerance equalization lips are formed, the seal behaves more softly, so that good sealing at the inner surface of the seal holder is achieved over the whole periphery.

In addition, at least at the end face, the seal has a rib, which extends at right angles to the tolerance equalization lips there and blocks the grooves formed between the tolerance equalization lips and thus prevents printing ink flowing around the seal in these grooves. On the opposite end face, on which the whole surface of the seal lies in contact with the chambered doctor blade, a corresponding rib can be formed by the joint seam, which is formed anyhow during the production of the seal with the help of a two-part mold. In this way, a reliable seal is ensured also here.

BRIEF DESCRIPTION OF THE DRAWINGS

An example of the invention is explained in greater detail in the following by means of the drawing, in which.

DETAILED DESCRIPTION

Figure 1:
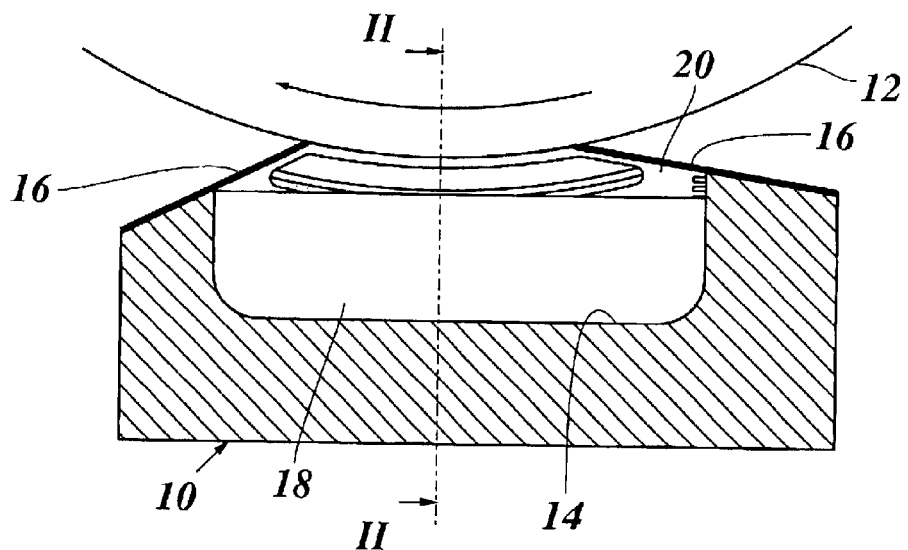
FIG. 1 shows a section through a chambered doctor blade with an inventive seal.

FIG. 1 shows a cross section of a chambered doctor blade 10, which is in contact with the periphery of an anilox roller 12 rotating in the clockwise direction. The chambered doctor blade 10 has a gutter profile, by means of which a chamber 14 is bounded, which is closed off at the side, facing the anilox roller 12, by two doctor blades 16, which are disposed in roof-shaped fashion, as well as by the peripheral surface of the anilox roller 12. The doctor blade 16 scrapes along the periphery of the anilox roller 12 with one edge.

Figure 2:
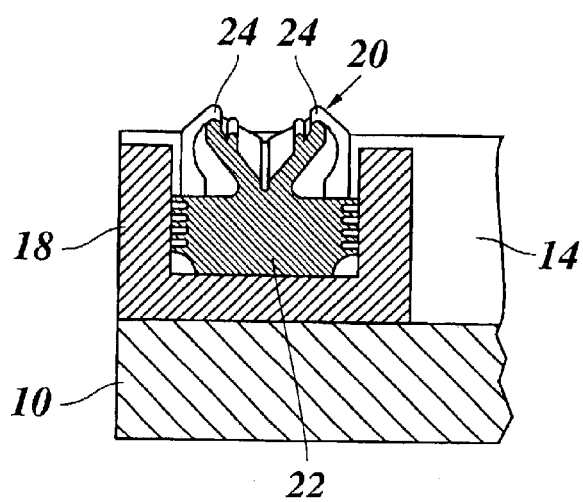
FIG. 2 shows a section along the line II—II of FIG. 1.

The chamber 14 is closed off at both ends by a seal holder 18 and by a seal 20, which is inserted therein. The seal holder 18 is fitted liquid-tight into the gutter profile of the chamber 14 and, in turn, forms a U-shaped gutter, which extends transversely to this gutter profile and into which the seal 20 is inserted, as can be seen more clearly in FIG. 2.

The seal 20 consists of a rubber-elastic material with Shore hardness of 60 to 90 and preferably of 80 and forms a rectangular support 22, which is fitted tightly into the cavity bounded by the seal holder 18 and the walls of the chamber 14. On the upper side, that is, on the side facing the anilox roller 12, the seal forms two lips 24, which extend in the peripheral direction of the anilox roller 12, are constructed symmetrically to one another and together form a V-shaped cross section. These lips 24 lie against the peripheral surface of the anilox roller 12 as well as against the inner surfaces of the doctor blade 16, forming a seal. The angle between the lips 24 and the surface of the support 22 in each case is about 50° so that the lips enclose an angle of about 80° with one another.

Figure 3:
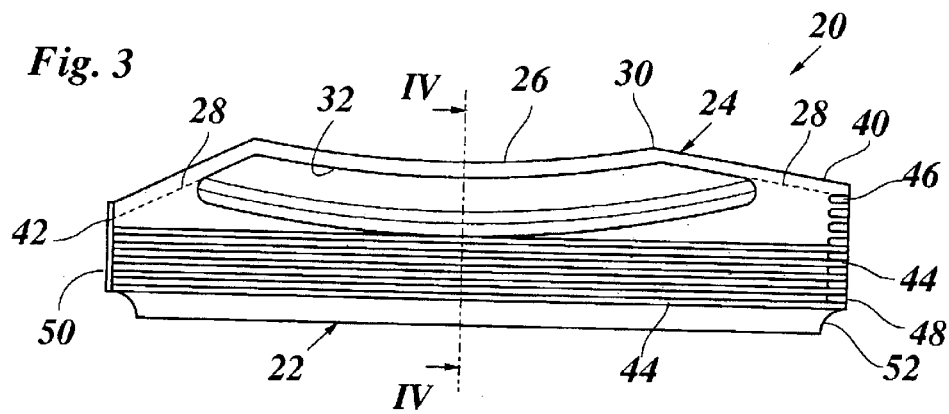
FIG. 3 shows a side view of the seal.
Figure 4:
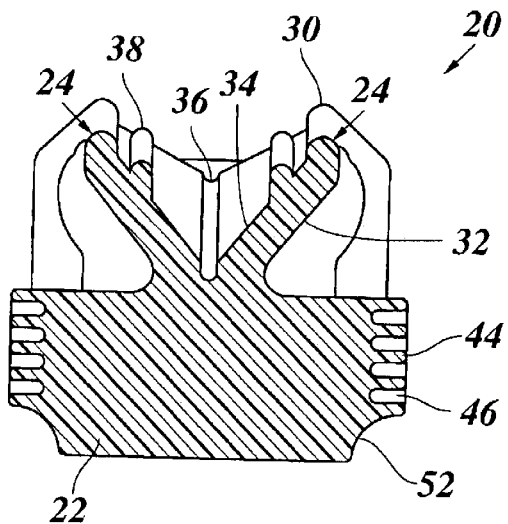
FIG. 4 shows an enlarged section along with line IV—IV in FIG. 3.
Figure 5:
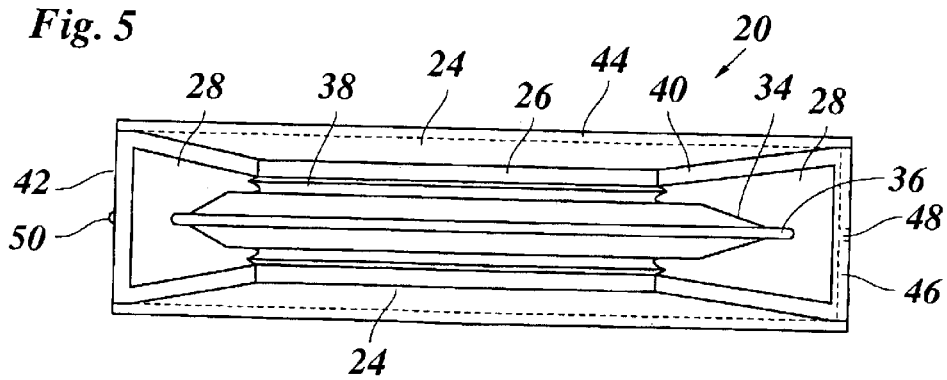
FIG. 5 shows the seal of FIG. 3 in plan view.

The seal 20 is shown in detail in FIGS. 3 to 5. In the side view of FIG. 3, the lips 24 in each case have a concave middle part 26, which is adapted to the curvature of the anilox roller 12. Adjoining each end of the middle part, there is a linear supporting zone 28 for the doctor blade 16 in question. At the transitions between the middle part 26 and the supporting zones 28, the main ridge of each lip forms an obtuse-angled crest 30, which, in the ideal case, lies at the place at which the edge of the doctor blade contacts the anilox roller. In practice, however, this point cannot be determined with sufficient accuracy, because the doctor blade is subject to wear during the printing operation.

On the outside, the lips 24 are bounded in each case by a pocket 32, which follows the contour of the concave middle part 26; however, it extends also some distance below the supporting zones 28.

As shown by FIG. 4, the two lips 24 are bounded on the inside by a V-shaped notch 34, which, following the curvature of the concave middle part 26, passes through the center of the seal and at the bottom of which there is a deeper and narrower groove 36. The stiffness of the lips 24 can be adjusted by the cross section of the notch 34 and the depth of the groove 36.

Furthermore, each lip 24 also has a somewhat shorter auxiliary lip 38 on the inside of its main ridge. When the chamber doctor blade 10 is placed against the anilox roller and the lips 24 contact the anilox roller 12 and the doctor blades 16 with a slight pressure, the auxiliary lips are bent somewhat apart. In this way, the auxiliary lips 38 come into contact with the peripheral surface of the anilox roller 12, at least when there has been some wear of the main ridges.

FIG. 4 furthermore shows that the part of the seal 20, which forms the lips 24, at least in the concave middle part 26, has a smaller width than does the support 22. As can be seen more clearly in the plan view of FIG. 5, this lesser width comes about owing to the fact that the part of the seal 20, which forms the lips 24, tapers as a whole in pyramid fashion towards the top. The supporting zones 28 therefore have a trapezoidal configuration.

As can furthermore be seen in FIG. 5, the main ridges of the lips 24 change over into the supporting zones 28 in a slightly raised edge 40, which extends continuously over the whole of the peripheral edge of the seal. With their main ridges and the edge 40, the two lips 24 accordingly form a closed contact line, with which they lie tightly against the anilox roller and against the two doctor blades.

The V-shaped notch 34 runs out in the supporting zones 28 into the oblique, flat, trapezoidal surfaces of the seal and therefore decreases there in width, so that the cross section and, with that, the hardness of the lips 24 increase correspondingly towards the ends. In this way, on the one hand a sufficient hardness of the lips is achieved in the zones, which support the doctor blades 16. On the other, a sufficient compliance is achieved especially at the crests 30, so that the lips 24 can adapt there to the transition places between the periphery of the anilox roller and the doctor blades.

On an end face, at the left in FIGS. 3 and 5, the support 22 forms a smooth surface 42, with which the seal is supported stably and over the whole surface at the wall of the chamber 14, when it is exposed to the frictional forces of the rotating anilox roller 12. At the three remaining sides, the support 22 is surrounded by several continuous tolerance equalization ribs 44, which are separated from one another by grooves 46. The tolerance equalization ribs 44 compensate for dimensional tolerances between the seal 20 and the seal holder 18, so that the support 22 of the seal can be impressed easily and, nevertheless, tightly into the seal holder 18. At the end face, which is opposite to the smooth surface 42, the grooves 46 are interrupted by a rib 48. Should the printing ink have penetrated into the grooves 46, it is prevented by rib 48 from flowing from the inside, facing the chamber 14, to the outside of the seal into the groove 46.

On the opposite end face, 42, a flat rib 50 has a similar function. In contact with the wall of the chamber 14, the flat rib is pressed flat, so that the sealing effect is increased without affecting the stable support of the seal at this wall.

The seal 20 preferably is a molded part, which is prepared by injection molding. The rib 50 can then be formed simply by a parting ridge between the two halves of the mold.

At the lower edge, the support 22 has a continuous chamfer or channel 52, which enables the seal 20 to be seated correctly in the seal holder 18 even when dried ink residues have collected in the inner edges of the seal holder.

What is claimed is:

1. A seal for a chambered doctor blade of a printing machine, comprising a rubber-elastic body adapted for insertion in a seal holder at an end of a chambered doctor blade, said rubber-elastic body having first and second obliquely applied lips adapted to lie against a periphery of a roller against which the chambered doctor blade is placed, with the first and second lips forming a V-shaped cross section with each other for both sealing the same aforementioned end of the chambered doctor blade.

2. The seal of claim 1, wherein opposite ends or the two lips form supporting zones for doctor blades, which lie against the periphery of the roller, and wherein the hardness of the lips increases towards an end in the supporting zones.

3. The seal of claim 2, wherein main ridges of the lips change over into the supporting zones in a continuous edge about the whole seal, so that a closed contact line is formed between the seal on the one hand and the roller and the doctor blades on the other hand.

4. The seal of claim 3, wherein a distance between the main ridges of the lips is smaller in a center thereof than that at ends thereof.

5. The seal of claim 4, wherein a part of the seal facing the roller is constructed in a pyramid shape and wherein the two lips are bounded on an inside thereof by a V-shaped notch which runs out in the supporting zones into oblique surfaces of the pyramid shape.

6. The seal of claim 2, wherein the lips are bounded on an outside thereof by a pocket which extends at each end some distance into the supporting zone.

7. The seal of claim 1, wherein each lip, at least in a region adjacent to the roller, has an auxiliary lip which extends parallel to a main ridge thereof.

8. The seal of claim 1, wherein a part of the seal adapted to be taken up in the seal holder is constructed as a solid, rectangular support having one end face which is adapted to lie, with a smooth surface, against the chambered doctor blade and three remaining sides with continuous tolerance equalization lips.

9. The seal of claim 8, wherein the seal further includes grooves formed between the tolerance equalization lips, the grooves being blocked off at an end face of the support which is opposite said one end face, by a rib which extends at right angles to the tolerance equalization lips.

10. The seal of claim 1, wherein the two lips enclose an angle of about 80° with one another.

11. The seal of claim 3, wherein the lips are bounded on an outside thereof by a pocket which extends at each end some distance into the supporting zone.

12. The seal of claim 4, wherein the lips are bounded on an outside thereof by a pocket which extends at each end some distance into the supporting zone.

13. The seal of claim 5, wherein the lips are bounded on an outside thereof by a pocket which extends at each end some distance into the supporting zone.

14. The seal of claim 2, wherein each lip, at least in a region adjacent to the roller, has an auxiliary lip which extends parallel to a main ridge thereof.

15. The seal of claim 3, wherein each lip, at least in a region adjacent to the roller, has an auxiliary lip which extends parallel to a main ridge thereof.

16. The seal of claim 4, wherein each lip, at least in a region adjacent to the roller, has an auxiliary lip which extends parallel to a main ridge thereof.

17. The seal of claim 2, wherein a part of the seal adapted to be taken up in the seal holder is constructed as a solid, rectangular support having one end face which is adapted to lie, with a smooth surface, against the chambered doctor blade and three remaining sides with continuous tolerance equalization lips.

18. The seal of claim 3, wherein a part of the seal adapted to be taken up in the seal holder is constructed as a solid, rectangular support having one end face which is adapted to lie, with a smooth surface, against the chambered doctor blade and three remaining sides with continuous tolerance equalization lips.

19. The seal of claim 4, wherein a part of the seal adapted to be taken up in the seal holder is constructed as a solid, rectangular support having one end face which is adapted to lie, with a smooth surface, against the chambered doctor blade and the remaining sides with continuous tolerance equalization lips.

20. The seal of claim 5, wherein a part of the seal adapted to be taken up in the seal holder is constructed as a solid, rectangular support having one end face which is adapted to lie, with a smooth surface, against the chambered doctor blade and three remaining sides with continuous tolerance equalization lips.

21. A printing machine, comprising:
 a roller,
 a chambered doctor blade in contact with a periphery of the roller, the chambered doctor blade including a seal holder at an end thereof, and
 a rubber-elastic body inserted in the seal holder at the end of the chambered doctor blade, said rubber-elastic body having first and second obliquely applied lips lying against a periphery of the roller against which the chambered doctor blade is placed, with the first and second lips forming a V-shaped cross section with each other such that both lips seal the same aforementioned end of the chambered doctor blade.

\* \* \* \* \*